(12) United States Patent
Iversen et al.

(10) Patent No.: US 11,940,077 B2
(45) Date of Patent: Mar. 26, 2024

(54) EXTENDED DIRECT ELECTRIC HEATING SYSTEM

(71) Applicant: NEXANS, Courbevoie (FR)

(72) Inventors: Oyvind Iversen, Ski (NO); Torunn Lund Clasen, Halden (NO)

(73) Assignee: NEXANS, Courbevoie (FR)

( * ) Notice: Subject to any disclaimer, the term of this patent is extended or adjusted under 35 U.S.C. 154(b) by 138 days.

(21) Appl. No.: 16/018,932

(22) Filed: Jun. 26, 2018

(65) Prior Publication Data
US 2019/0137025 A1    May 9, 2019

(30) Foreign Application Priority Data

Jun. 30, 2017   (EP) .................................... 17305845

(51) Int. Cl.
| | |
|---|---|
| *F16L 53/00* | (2018.01) |
| *E21B 17/00* | (2006.01) |
| *E21B 36/04* | (2006.01) |
| *E21B 43/01* | (2006.01) |
| *F16L 53/37* | (2018.01) |

(52) U.S. Cl.
CPC ............ *F16L 53/37* (2018.01); *E21B 17/003* (2013.01); *E21B 36/04* (2013.01); *E21B 43/01* (2013.01)

(58) Field of Classification Search
CPC .............................. F16L 53/37; H05B 2214/03
See application file for complete search history.

(56) References Cited

U.S. PATENT DOCUMENTS

| | | | | |
|---|---|---|---|---|
| 3,971,416 A | * | 7/1976 | Johnson ................. | H02G 15/10 137/341 |
| 5,732,746 A | * | 3/1998 | Leroy ..................... | B32B 27/12 138/123 |
| 6,049,657 A | * | 4/2000 | Sumner .................. | E21B 17/01 392/469 |
| 6,142,707 A | * | 11/2000 | Bass ...................... | E21B 17/015 405/158 |
| 6,264,401 B1 | * | 7/2001 | Langner ................. | F16L 53/37 405/169 |
| 6,278,095 B1 | * | 8/2001 | Bass ...................... | F16L 53/004 166/248 |
| 6,509,557 B1 | * | 1/2003 | Bass ...................... | H05B 6/108 219/772 |
| 6,564,011 B1 | * | 5/2003 | Janoff .................... | E21B 36/04 392/480 |
| 7,992,632 B2 | * | 8/2011 | Bornes ................... | E21B 43/01 166/61 |
| 8,592,731 B2 | * | 11/2013 | Schild .................... | B32B 27/36 219/535 |

(Continued)

OTHER PUBLICATIONS

European Search Report dated Dec. 15, 2017.

*Primary Examiner* — Helena Kosanovic
*Assistant Examiner* — Lawrence H Samuels
(74) *Attorney, Agent, or Firm* — Sofer & Haroun, LLP

(57) ABSTRACT

An extended Direct Electric Heating system includes a conduit arrangement for transporting fluid from at least one subsea well apparatus to a topside or onshore location/The conduit arrangement has at least one Direct Electric Heating conduit section arranged adjacent to at least one heat traced conduit section in a longitudinal direction of the conduit sections between a subsea connection point and the at least one subsea well apparatus.

15 Claims, 4 Drawing Sheets

(56) References Cited

U.S. PATENT DOCUMENTS

| | | | | |
|---|---|---|---|---|
| 8,705,949 | B2* | 4/2014 | Kinnari | F16L 53/37 |
| | | | | 392/301 |
| 9,253,821 | B2* | 2/2016 | Bremnes | H05B 3/0004 |
| 2003/0235471 | A1* | 12/2003 | Bass | F16L 25/026 |
| | | | | 405/154.1 |
| 2007/0098375 | A1* | 5/2007 | Kinnari | F16L 53/37 |
| | | | | 392/301 |
| 2008/0236810 | A1* | 10/2008 | Borres | E21B 43/01 |
| | | | | 166/61 |
| 2009/0214196 | A1* | 8/2009 | Bremnes | H05B 3/40 |
| | | | | 392/480 |
| 2012/0217000 | A1* | 8/2012 | Bremnes | E21B 17/01 |
| | | | | 166/57 |
| 2014/0376900 | A1* | 12/2014 | Bjerknes | F24H 9/00 |
| | | | | 392/480 |
| 2018/0066770 | A1* | 3/2018 | Hoyvik | F16L 1/16 |
| 2018/0087694 | A1* | 3/2018 | Cherkaoui | H05B 3/42 |

* cited by examiner

US 11,940,077 B2

EXTENDED DIRECT ELECTRIC HEATING SYSTEM

RELATED APPLICATION

This application claims the benefit of priority from European Patent Application No. 17 305 845.4, filed on Jun. 30, 2017, the entirety of which is incorporated by reference.

TECHNICAL FIELD

The present invention relates to subsea Direct Electric Heating systems, in particular the invention relates to an extended Direct Electric Heating system which can provide heating along the complete length of a subsea conduit extending from a subsea well apparatus to a subsea connection point.

BACKGROUND ART

Subsea oil and gas production is increasingly taking place in deeper, colder and more remote areas, where the ambient water temperature at the seafloor may be only a few degrees above 0° Celsius. Though well fluids are relatively hot once brought out of a well, the ambient water in these areas will cool the fluids as they flow in subsea conduits along the seafloor. As long as the well fluids are continuously flowing, the temperature decrease is counteracted by the arrival of warm fluids from the well. However, events such as a temporary well shutdown can cause an interruption of the flow whereby the immobile well fluids cool to a temperature at which hydrates and wax plugs may form. Under the appropriate environmental conditions, such as reduced flow and decreased temperatures, hydrates and wax plugs may precipitate, thereby blocking flow and ultimately causing conduits to plug and block. These plugs can be difficult and time consuming to remove, causing delays in production and being a major factor in increased costs.

One known solution to this problem is a system known as Direct Electrical Heating (DEH), where electric current is passed through the subsea conduit itself, employing the conduit (which is made of an electrically conductive metal such as steel) as a resistor. A section of the subsea conduit comprises a cable strapped to its outside, a so-called piggyback cable, extending between two ends of the section. The piggyback cable is electrically connected at a near end (nearer to the topside) and at a far end (nearer to the subsea well) of the conduit, thus forming a circuit. As electrical current is circulated in the circuit, the resistance of the metal conduit converts the electric energy to heat which is passed on to the well fluid inside the conduit. Direct Electrical Heating (DEH) systems are often used over very long distances.

While Direct Electric Heating provides a robust solution to the problem of hydrate plugs, it has certain limitations. One important disadvantage is the fact that current is not only circulated in the conduit, but also in the surrounding water. This stray current may damage sensitive equipment. Such subsea equipment is therefore often located at a distance from the termination of a Direct Electric Heating section, leaving an unheated conduit section prone to plugging. Other situations may also arise where it is impractical to arrange a DEH system along the entire length of the conduit. These unheated sections are susceptible to blockage in the event of an interruption in the pipeline flow, however.

One known solution to this problem is to utilize the topography of the seabed to ensure that, in the event of flow stoppage, any fluids in the unheated sections will drain by the force of gravity into a section heated by the DEH system. As can be appreciated, this is not possible in all locations. It is therefore often necessary to inject plug-inhibiting chemicals into such unheated sections of the conduit. The use of chemicals is both costly, complicated and may have a negative environmental impact.

There is a need, therefore, for an improved system for heating the complete length of a subsea conduit that takes advantage of a DEH system for the majority of the length of the conduit, but which also heats areas of the conduit unsuited for use of DEH.

SUMMARY OF THE INVENTION

The present invention provides an extended DEH system for heating a subsea conduit, comprising a Direct Electric Heating arrangement along a significant length of the conduit (hereafter the "Direct Electric Heating conduit section") and one or more resistive heating elements along a section or sections of the conduit where Direct Electric Heating is not suitable (hereafter a "heat traced conduit section"), such as for example areas close to a subsea well apparatus or other subsea equipment which are sensitive to stray currents from the Direct Electric Heating conduit section. Examples of such equipment include subsea pumps, manifolds, jumpers, spools and flowline end sections.

In an aspect of the invention, the heat traced conduit section comprises:
- a fluid transport pipe,
- at least one electric heating cable arranged on the outside wall of the fluid transport pipe,
- at least one thermally insulating layer arranged to cover the fluid transport pipe and the at least one heating cable.

The Direct Electric Heating conduit section may typically be within the range of 0 to 80 km in length. The length of the heat traced conduit section may in one aspect be from 0 to 300 meters in length, the length being governed by considerations such as the voltage of the current in the Direct Electric Heating conduit section, the sensitivity of the subsea equipment or subsea well apparatus, subsea topography and reservoir fluids.

According to one aspect, the system of the invention comprises separate power supplies, a first power supply for the Direct Electric Heating conduit section and a second power supply for the heat traced conduit section. Advantageously the power supplies are not arranged in series, thus achieving a more redundant system. The second power supply may originate from a separate topside or onshore location to the first power supply.

According to another aspect, the Direct Electric Heating conduit section has a near end and a far end. The near end is connected to a subsea connection point, from which a first conduit section, such as a riser, connects to a top side or onshore location, while the heat traced conduit section is arranged between the far end of the Direct Electric Heating conduit section and a subsea well apparatus or other subsea equipment.

According to yet another aspect, the heat traced conduit section is essentially adjacent in the longitudinal direction to the Direct Electric Heating conduit section and/or the sensitive equipment. As used herein. the term "adjacent" or "essentially adjacent" or "adjacent sections" should be understood such that the sections are lying either directly next to each other or in such proximity that there is no need for additional plug-inhibiting measures to avoid hydrate or wax plugs between adjacent sections.

BRIEF DESCRIPTION OF DRAWINGS

The invention will be described in detail with reference to the attached drawings wherein.

DETAILED DESCRIPTION OF THE INVENTION

Figure 1:
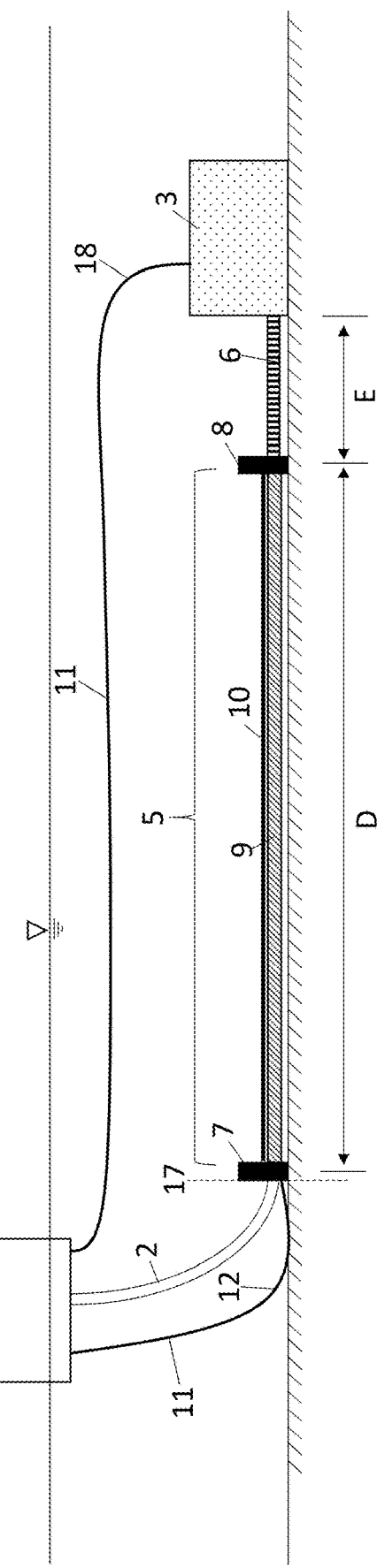
FIG. 1 schematically illustrates an aspect of the invention, where an example of an extended Direct Electric Heating system is shown from a side perspective.
Figure 2:
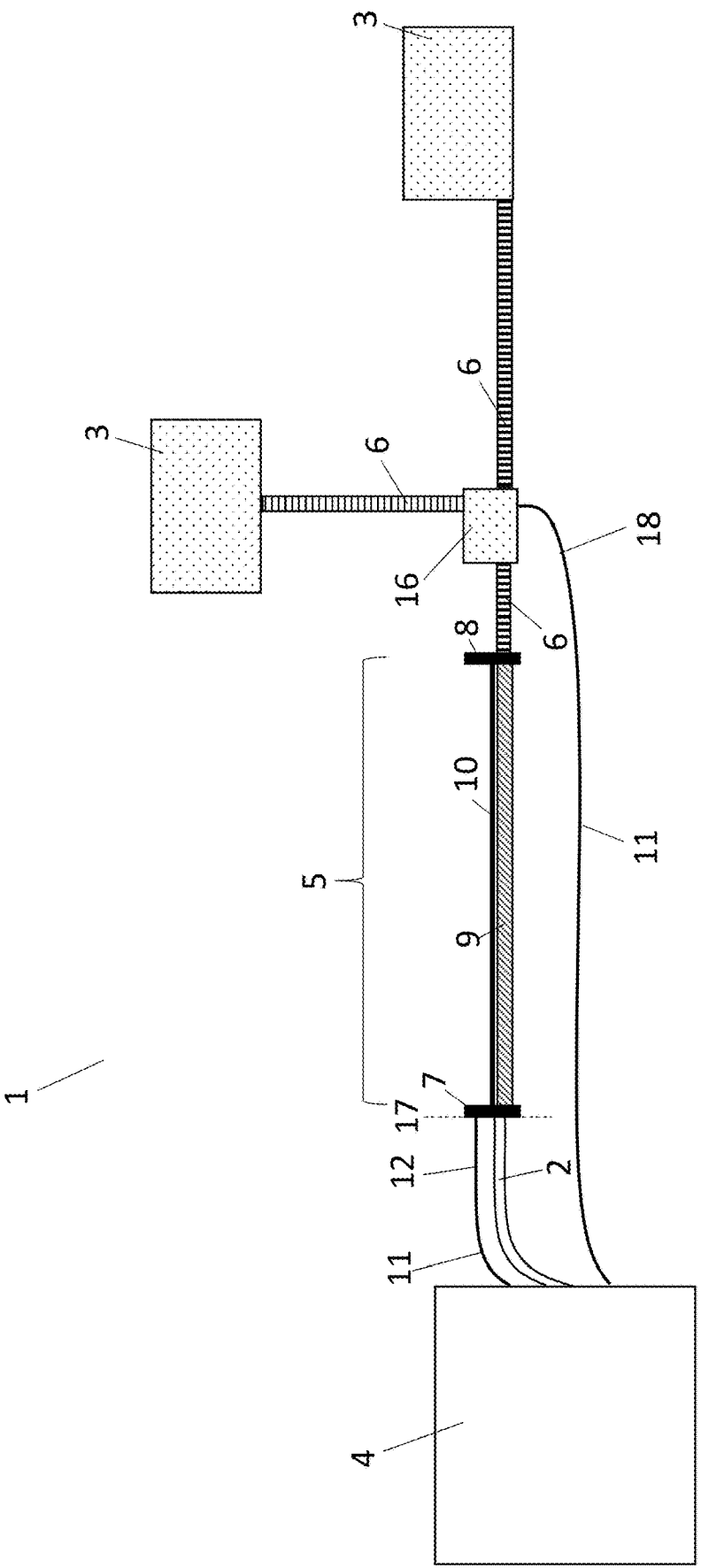
FIG. 2 schematically illustrates an aspect of the invention, where an example of an extended Direct Electric Heating system is shown from a bird's-eye view.
Figure 3:
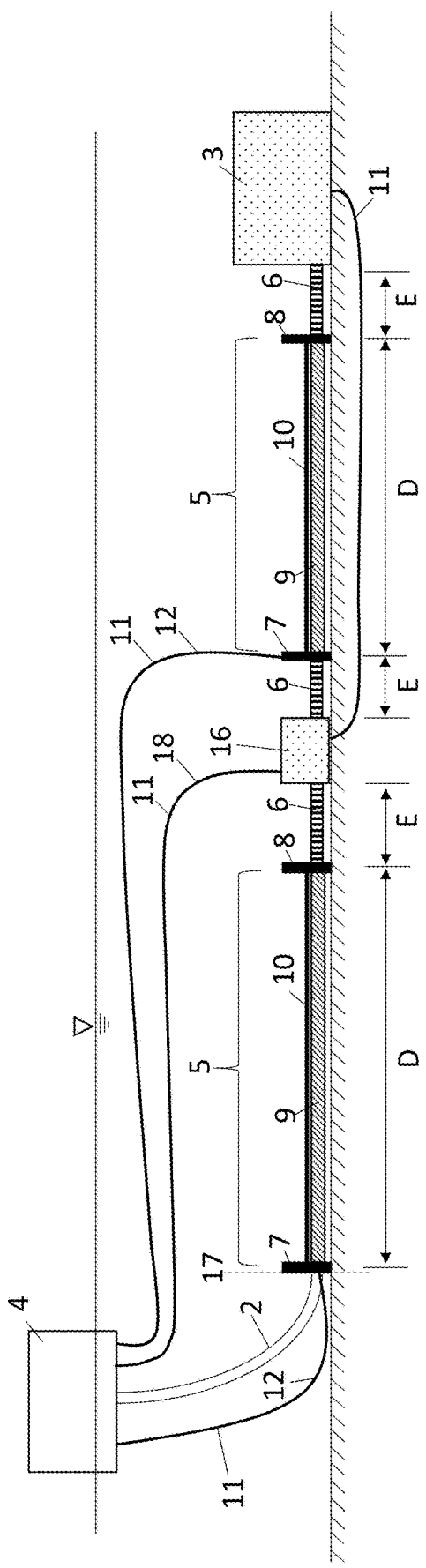
FIG. 3 schematically illustrates an aspect of the invention, where an example of an extended Direct Electric Heating system with two Direct Electric Heating conduit sections is shown from a side perspective.

FIGS. 1-3 illustrate possible embodiments of the invention used in a conduit arrangement for transporting well fluid between at least one subsea well apparatus 3 and a topside location 4, exemplified as a floating unit lying in a body of water. Subsea well apparatus 3 may comprise, for example, an assembly of flow-control valves, spools and fittings known in the art as a "tree" or "Christmas tree". Topside location 4 may comprise a floating production and storage facility or similar. Alternatively, topside location 4 may comprise a land-based production and storage facility.

As shown in FIGS. 1-3 the system of the invention 1 comprises one or more elongated fluid transport conduit sections arranged as a Direct Electric Heating conduit section 5. Direct Electric Heating conduit sections 5 extend a distance D, and comprise an electrically conductive fluid transport pipe 9 upon which is arranged a piggyback cable 10. A first electrical power supply 12 is electrically connected via an umbilical 11 to a near end 7 of the conductive fluid transport pipe 9 and via piggyback cable 10 to a far end 8 of conductive fluid transport pipe 9.

Typically, the electrically conductive fluid transport pipe 9 comprises a steel pipe, or similar material which makes it suitable to act as a resistor. The piggyback cable 10 is strapped on the outside of the electrically conductive fluid transport pipe 9 and runs along the pipe 9 to the far end 8 where it is electrically connected to the pipe 9, thus forming an electric circuit. When an appropriate current is applied, the fluid transport pipe 9 will heat up due to electrical resistance. The distance D between the far end 8 and the near end 7 of the Direct Electric Heating conduit section 5 is predetermined, and dependent on the field development, especially how far the topside is located from the subsea well apparatus. The predetermined distance D will therefore be apparent to the person skilled in the art based on the field developments characteristics and the description of the invention herein.

Direct Electric Heating conduit sections 5 terminate at a distance E from subsea well apparatus 3 or from other subsea equipment 16 as shown in FIG. 1-3. Distance E represents sections of the fluid transport conduit where it is not suited for use of a DEH system due to various practical considerations. According to one aspect, distance E corresponds at least to the minimum safe distance between the equipment and the Direct Electric Heating conduit sections 5 necessary to avoid interference with or damage to the equipment from stray current generated by the DEH system. As shown in the figures, distance E may arise between the Direct Electric Heating conduit sections 5 and apparatus/equipment 3,16, or between instances of the equipment itself.

Figure 4:
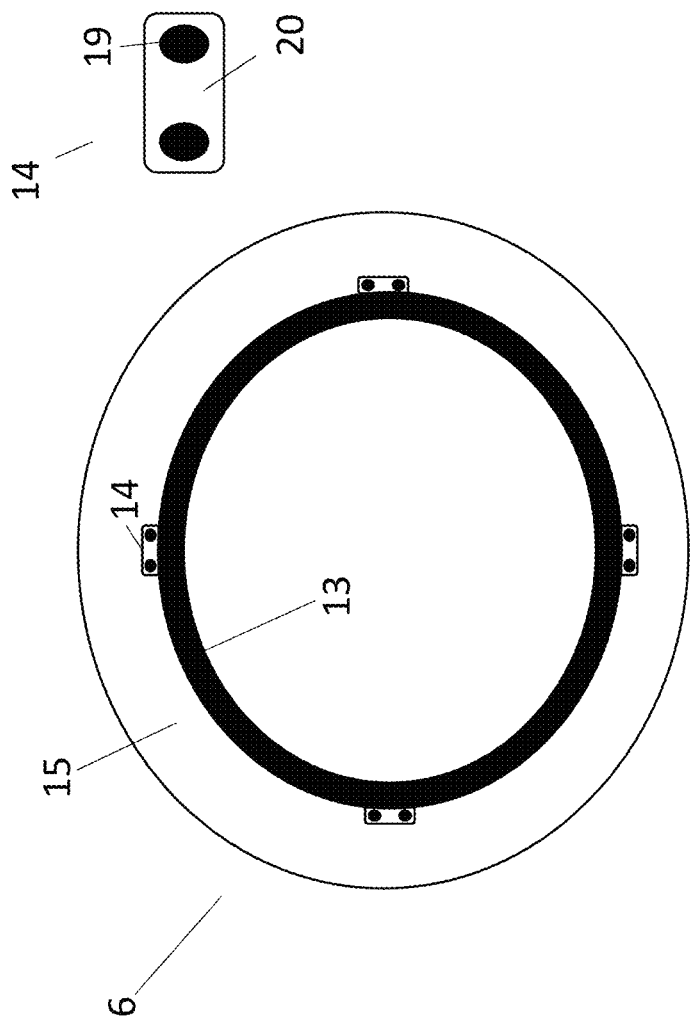
FIG. 4 schematically illustrates an aspect of the invention, where an example of a heat traced conduit cross section is shown.

The system of the invention further comprises, arranged in distance E, sections of conduit heated by resistive heating elements, designated as heat traced conduit sections 6. As shown in FIG. 4 heat traced conduit sections 6 comprise a concentrically innermost fluid transport pipe 13. One or more electric heating cables 14 are arranged on the outer wall of the fluid transport pipe 13. In one embodiment, the heating cables 14 comprise conducting elements 19 enclosed in a layer of electric insulation 20. Surrounding the heating cables 14 and fluid transport pipe 13 is a thermally insulating layer 15 arranged so as to prevent heat loss to the environment surrounding the heat traced conduit section 6.

According to one aspect, the heat traced conduit section extends or covers essentially the entirety of distance E. As used herein, the term "essentially" means that a sufficient portion or portions of distance E is covered by the heat traced conduit section such that there is no need for additional plug-inhibiting measures within distance E. The term thus will be dependent upon the nature of the fluid and/or the effective heating capacity of the heat traced conduit section.

Electric heating cables 14 are supplied with electric current by a power supply. In one embodiment, electric heating cables 14 are supplied with electric current by a second power supply 18 as shown in FIGS. 1-3. According one aspect, this may be the same power supply used for subsea apparatus 3 or equipment 16. FIGS. 1-3 show an umbilical cable 11 extending from the topside location 4 to subsea equipment 16 or a subsea well apparatus 3 for supply of electrical power to these and heat traced conduit sections 6. The subsea equipment 16 may comprise a subsea electric distribution system (not shown) with more umbilicals leading to more subsea equipment 16 and heat traced conduit sections 6.

According to aspect, near end 7 of the most downstream Direct Electric Heating conduit section 5 may terminate at a subsea connection point 17. A first conduit section 2, for example a riser, extends from topside location 4 to subsea connection point 17. The subsea connection point 17 may be located near a touchdown point of the riser, where the riser may be anchored to the seabed or connected to a flowline end termination as will be apparent to the person skilled in the art.

One skilled in the art will recognize that various configurations are possible within the scope of the invention. FIGS. 1-3 illustrate non-limiting examples of possible configurations.

FIG. 1 shows an example of the invention where the near end 7 of the Direct Electric Heating section 5 meets a first conduit section 2 at a subsea connection point 17, from where the first conduit section 2 extends to the topside location 4. At the Direct Electric Heating section's 5 far end 8, a heat traced conduit section 6 is arranged to extend a predetermined distance E to the subsea well apparatus 3. A first electric power supply 12 comprising an umbilical 11 extends from the topside location 4 to the near end 7 of the Direct Electric Heating section 5, and a second electric power supply 18 extends to the subsea well apparatus 3 and heat traced conduit section 6.

FIG. 2 illustrates another example of the invention from a bird's-eye view, where a subsea equipment 16 is arranged in between two subsea well apparatuses 3 and the far end 8 of a Direct Electric Heating conduit section 5. As illustrated in FIG. 2 there are two heat traced conduit sections 6, on each side of the subsea equipment 16. In other aspects of the invention, the conduits situated between subsea equipment 16 and subsea well apparatus 3 do not necessarily comprise a heat traced conduit section 6, but may comprise regular conduits or other kinds of hydrate inhibiting systems known from the prior art. A first electric power supply 12 comprising an umbilical 11 extends from the topside location 4 to the near end 7 of the Direct Electric Heating section 5, and a second electric power supply 18 extends to the subsea equipment 16 and heat traced conduit sections 6.

FIG. 3 illustrates an example where two Direct Electric Heating conduit sections 5 are arranged between a subsea connection point 17 and a subsea well apparatus 3. Between the two Direct Electric Heating conduit sections 5 is a subsea equipment 16. First electric power supplies 12 comprising umbilicals 11 extends from the topside location 4 to the near ends 7 of the Direct Electric Heating sections 5. A second electric power supply 18 extends to a subsea equipment 16, from where another umbilical provides power to a further subsea well apparatus 3 and associated heat traced conduit section 6.

Yet further variations and combinations of subsea conduit arrangements can be designed for a certain field development and are possible within the scope of the claims, as will be obvious to the person skilled in the art based upon the disclosure of the invention herein.

The invention claimed is:

1. An system for heating fluid transport pipes from at least one subsea well apparatus to a topside or onshore location, said system comprising:
   at least one Direct Electric Heating conduit section having a conductive fluid transport pipe, said Direct Electric Heating conduit section arranged between the topside or onshore location and a distance to a subsea well apparatus,
   wherein said Direct Electric Heating conduit section is connected to a first electrical power supply, coupled to a topside location having power, is said first electrical power supply being connected to a near end of said conductive fluid transport pipe of said Direct Electric Heating conduit section, and to a far end of the electrically conductive fluid transport pipe via a piggyback cable, mounted on the electrically conductive fluid transport pipe, to form a circuit, such that electrical current circulates first though said piggyback cable and then back through said electrically conductive fluid transport pipe and the surrounding seawater, said electrically conductive fluid transport pipe having a resistance configured to convert electrical current to heat when electrical current is circulated in the circuit,
   wherein said system also has a heat traced conduit section, separate from said Direct Electric Heating conduit section, that is arranged between an end of the Direct Electric Heating conduit section and the subsea well apparatus in the longitudinal direction,
   wherein the at least one heat traced conduit section is arranged on a second inner most fluid transport pipe and has,
      at least one electric heating cable arranged on the outside wall of the second inner most fluid transport pipe starting at said subsea well apparatus and extending to and terminating near said end of said Direct Electric Heating conduit section, the electric heating cable comprising two conducting elements that are enclosed within electrical insulation,
      at least one thermally insulating layer arranged to cover the second inner most fluid transport pipe and the at least one electrically insulated electric heating cable, and
      a second electrical power supply, coupled with said topside location having power, connected to the at least one electric heating cable through said subsea well apparatus,
   wherein said first electrical power supply for said Direct Electric Heating conduit section and said second electrical power supply for said heat trace conduit section are separate electrical paths not connected in series.

2. The system for heating fluid transport pipes according to claim 1, further comprising a subsea equipment arranged intermediate the Direct Electric Heating conduit section and the subsea well apparatus, and where the heat traced conduit section is arranged between the Direct Electric Heating conduit section and the subsea equipment.

3. The system for heating fluid transport pipes according to claim 2, wherein a first Direct Electric Heating conduit section is arranged between the topside or onshore location and the subsea equipment and a second Direct Electric Heating conduit section is arranged between another subsea equipment and the subsea well apparatus.

4. The system for heating fluid transport pipes according to claim 1, wherein at least one heat traced conduit section extends between a plurality of subsea equipments.

5. The system for heating fluid transport pipes according to claim 2, wherein at least one heat traced conduit section extends between at least one subsea equipment and the at least one subsea well apparatus.

6. The system for heating fluid transport pipes according to claim 3, wherein the subsea equipment comprises any one or more of subsea pumps, manifolds, jumpers, spools and flowline end sections.

7. The system for heating fluid transport pipes according to claim 1, wherein the heat traced conduit section is arranged essentially adjacent, end to end, to the Direct Electric Heating conduit section in the longitudinal direction.

8. The system for heating fluid transport pipes according to claim 1, wherein
   a. the subsea well apparatus and/or a subsea equipment are of the type that is susceptible to interference from, or damage by, stray currents from the Direct Electric Heating conduit section within a defined distance,
   b. the Direct Electric Heating conduit section extends a predetermined distance between a near end and a far end, the near end being located downstream of the far end, said far end terminating at said defined distance, or greater, from the subsea well apparatus and/or subsea equipment.

9. The system for heating fluid transport pipes according to claim 8, wherein the heat traced conduit section extends substantially the entirety of distance between the Direct Electric Heating conduit section and the subsea well apparatus and/or the subsea equipment.

10. The system for heating fluid transport pipes according to claim 8, wherein the predetermined distance is within the range of 0 to 300 meters.

11. The system for heating fluid transport pipes according to claim 8, wherein the predetermined distance is within the range of 0 to 80 kilometers.

12. The system for heating fluid transport pipes according to claim 1, wherein the first and/or second electrical power supply comprises an umbilical cable extending to the topside or onshore location.

13. The system for heating fluid transport pipes according to claim 1, wherein a near end of a most downstream Direct Electric Heating conduit section is connected to a subsea connection point, said subsea connection point adapted for receiving a first conduit section extending from the topside or onshore location to the subsea connection point.

14. The system for heating fluid transport pipes according to claim 4, wherein the subsea equipment comprises any one or more of subsea pumps, manifolds, jumpers, spools and flowline end sections.

15. The system for heating fluid transport pipes according to claim 5, wherein the subsea equipment comprises any one or more of subsea pumps, manifolds, jumpers, spools and flowline end sections.

* * * * *